(12) United States Patent
So et al.

(10) Patent No.: US 10,061,904 B2
(45) Date of Patent: *Aug. 28, 2018

(54) DIGITAL RIGHTS MANAGEMENT WITH IRREGULAR NETWORK ACCESS

(71) Applicant: Google Technology Holdings LLC, Mountain View, CA (US)

(72) Inventors: Nicol C. So, Horsham, PA (US); Thomas L. Du Breuil, Ivyland, PA (US); Barry P. Falvo, Eagleville, PA (US); Rama Raju Kaldindi, Franklin Park, NJ (US); Ambikacharan P. Makam, San Diego, CA (US); Geetha Mangalore, San Diego, CA (US); Paul Moroney, La Jolla, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/964,952

(22) Filed: Dec. 10, 2015

(65) Prior Publication Data

US 2016/0092663 A1 Mar. 31, 2016

Related U.S. Application Data

(63) Continuation of application No. 14/322,878, filed on Jul. 2, 2014, now Pat. No. 9,336,365, which is a
(Continued)

(51) Int. Cl.
*G06F 21/10* (2013.01)
(52) U.S. Cl.
CPC ...... *G06F 21/10* (2013.01); *G06F 2221/2135* (2013.01)

(58) Field of Classification Search
CPC ...................................................... G06F 21/10
See application file for complete search history.

(56) References Cited

U.S. PATENT DOCUMENTS

| 7,861,308 B2 | 12/2010 | Strohwig et al. |
| 2002/0107701 A1 | 8/2002 | Batty et al. |
(Continued)

FOREIGN PATENT DOCUMENTS

| EP | 1780640 | 5/2007 |
| WO | WO 02/06931 | 1/2002 |

OTHER PUBLICATIONS

Third Office Action for Chinese Patent Application No. CN 201180025297.1, dated Jan. 4, 2016, 6 Pages.
(Continued)

*Primary Examiner* — Jason C Chiang
(74) *Attorney, Agent, or Firm* — Young Basile Hanlon & MacFarlane, P.C.

(57) ABSTRACT

There is a performing of digital rights management (DRM), operable in an offline mode with respect to a communications network. The performing includes identifying a stored rights object associated with a stored asset. The stored rights object includes reporting duration information associated with the stored asset. The performing also includes determining, utilizing a processor, whether a transmission of an early status message is a successful communication based on an early status message determination. If a failure in communicating the early status message is determined, utilizing the stored asset. The performing may also include transmitting an early status message and/or later status message after identifying the stored rights object. There is also a performing of digital rights management (DRM) associated with a DRM system and operable in an offline mode with respect to a communications network. There are also client devices,
(Continued)

Reporting Protocol
Data Object
600

| total expiration period value field 601 | play window start time value field 605 |
| expiration period start time value field 602 | play window expiration time value field 606 |
| remaining expiration period duration value field 603 | remaining play window duration time value field 607 |
| total play window duration value field 604 | local current time value field 608 | communicating systems, computer readable mediums and protocols.

18 Claims, 8 Drawing Sheets

Related U.S. Application Data continuation of application No. 13/113,590, filed on May 23, 2011, now Pat. No. 8,813,238.

(60) Provisional application No. 61/347,079, filed on May 21, 2010.

(56) References Cited

U.S. PATENT DOCUMENTS

| | | |
|---|---|---|
| 2005/0008163 A1 | 1/2005 | Leser et al. |
| 2006/0026103 A1 | 2/2006 | Lee |
| 2006/0031222 A1* | 2/2006 | Hannsmann ............ G06F 21/10 |
| 2007/0005504 A1* | 1/2007 | Chen ...................... G06Q 30/06 |
| | | 705/59 |
| 2007/0112680 A1 | 5/2007 | van Niekerk et al. |
| 2007/0288383 A1 | 12/2007 | Kim et al. |
| 2008/0103976 A1 | 5/2008 | Read et al. |
| 2008/0109364 A1 | 5/2008 | Han et al. |
| 2008/0147556 A1 | 6/2008 | Smith et al. |
| 2008/0155648 A1* | 6/2008 | Chae ....................... G06F 21/10 |
| | | 726/1 |
| 2008/0256645 A1 | 10/2008 | Choi et al. |
| 2009/0044008 A1 | 2/2009 | Lim |
| 2009/0151006 A1* | 6/2009 | Saeki ...................... G06F 21/10 |
| | | 726/28 |
| 2010/0017882 A1 | 1/2010 | Chou et al. |
| 2010/0061549 A1* | 3/2010 | Seo ...................... H04N 7/1675 |
| | | 380/42 |
| 2010/0186085 A1 | 7/2010 | Ta et al. |
| 2011/0041101 A1 | 2/2011 | Choi |

OTHER PUBLICATIONS

Chinese Office Action and English translation for Chinese Patent Application Serial No. 201180025297.1, dated Sep. 3, 2014, 7 pages.
Korean Office Action and English translation for Korean Patent Application No. 10-2012-7030329, dated Jun. 26, 2014, 13 pages.
PCT Search Report & Written Opinion, Application No. PCT/US2011/037566, dated Sep. 16, 2011.

\* cited by examiner

| Reporting Protocol Data Object 600 | play window start time value field 605 | play window expiration time value field 606 | remaining play window duration time value field 607 | local current time value field 608 |
|---|---|---|---|---|
| | total expiration period value field 601 | expiration period start time value field 602 | remaining expiration period duration value field 603 | total play window duration value field 604 |

FIG. 6A

| total expiration period value field 651 | play window start time value field 655 |
| expiration period start time value field 652 | play window expiration time value field 656 |
| remaining expiration period duration value field 653 | remaining play window duration time value field 657 |
| total play window duration value field 654 | online current time value field 658 |

Updating Protocol Data Object 650

FIG. 6B

DIGITAL RIGHTS MANAGEMENT WITH IRREGULAR NETWORK ACCESS

CROSS-REFERENCE TO RELATED APPLICATIONS

This application is a continuation of U.S. patent application Ser. No. 14/322,878, filed on Jul. 2, 2014, and entitled "DIGITAL RIGHTS MANAGEMENT WITH IRREGULAR NETWORK ACCESS," which is a continuation of U.S. patent application Ser. No. 13/113,590, filed on May 23, 2011, and entitled, "DIGITAL RIGHTS MANAGEMENT WITH IRREGULAR NETWORK ACCESS," which claims the benefit of priority to U.S. Provisional Patent Application Ser. No. 61/347,079, filed on May 21, 2010, entitled "METHOD OF SUPPORTING ACCESS MODELS IN DRM CLIENTS WITH INTERMITTENT NETWORK ACCESS," by Nicol C. So, et al. The entireties of each are incorporated herein by reference.

BACKGROUND

A digital rights management (DRM) system is a facility associated with managing the digital rights of a digital asset. The digital asset is often transmitted to a client device via a communications network. At the client device, the asset may be presented to a user directly upon receipt or stored at the client device for later utilization(s).

Regarding the various types of assets which are commonly downloaded or otherwise transferred to and stored at client devices, such as recorded video or audio files, movies, television broadcasts or other content having associated rights managed by a DRM system, the client devices are commonly required to first obtain an approval from the DRM system before utilizing a corresponding asset stored at the client device. This prior to usage approval from the DRM system provides the client device with an authorization to utilize or access the stored asset at the client device. This type of restriction often requires a client device to be in active communication (i.e., "online") with the DRM system in order to obtain, or to confirm whether the client device has obtained, a required approval. This is often an inconvenience to the user if the client device is ever offline. And it commonly causes a denial of access to the stored asset at the client device until it is again online and in communication with the DRM system.

Some DRM systems permit an offline client device to utilize a stored digital asset without requiring the device to first obtain approval from the DRM system regarding the stored asset's usage. However, although this often alleviates delays or inconveniences to a user utilizing the stored asset, it presents a breakdown in control over managing the rights associated with the asset by the DRM system. This is because the DRM system, had it been in direct communication with the client device, often would have denied or only granted a limited approval to the client device for usage of the stored asset.

Commonly, a user has control of multiple client devices forming a user group. The user group often includes a plurality of devices having a separate copy of the same stored asset. When any of the devices, in the group and/or the plurality within the group having a stored copy of the asset, are offline they are not in communication with the DRM system which is to manage the asset. In this circumstance, the DRM system is limited in determining whether the rights associated with the asset are being managed properly among the devices in the user group.

As noted above, some DRM systems permit an offline client device to utilize a stored copy of an asset, presenting a potential breakdown in control over managing the rights of the asset by the DRM system. This breakdown in control is often compounded when a plurality of client devices in a user group has a stored copy of the asset. This is due to the fact that more than one device in the plurality may have utilized the same asset one or more times, and/or at different times, during an offline period associated with one or more device in the group.

Often, a user of a first client device has already obtained an approval to utilize a same asset at a second device in a group of devices controlled by the user. Commonly, the first client device is still restricted from utilizing its own stored copy of a digital asset. If the user must first obtain direct authorization or access approval for the first client device, this is an inconvenience to the user and commonly results in a denial of access/approval to the user at the first client device. In the alternative, the DRM system may permit the offline client device to utilize a stored digital asset without requiring the client device to first obtain a prior approval. Thus presenting a breakdown in control of managing the rights associated with the asset by the DRM system.

Accordingly, client devices in an offline mode having a stored digital asset must be permitted to access or utilize the stored asset without any inconvenience or delay/denial of access to the user. These drawbacks are often associated with a requirement that client devices first obtain approval to access or utilize the stored asset from the DRM system managing the rights of the asset. At the same time, any loss of control in managing the rights of the asset associated with permitting client devices to utilize stored assets while offline must be reduced or eliminated.

BRIEF DESCRIPTION OF THE DRAWINGS

Features of the present disclosure will become apparent to those skilled in the art from the following description with reference to the figures, in which:

FIG. 6A is a block diagram illustrating a reporting protocol data object utilized in the methods shown in FIG. 4 and FIG. 5, according to an example of the present disclosure;

FIG. 6B is a block diagram illustrating an updating protocol data object utilized in the methods shown in FIG. 4 and FIG. 5, according to an example of the present disclosure.

SUMMARY OF THE INVENTION

Figure 1:
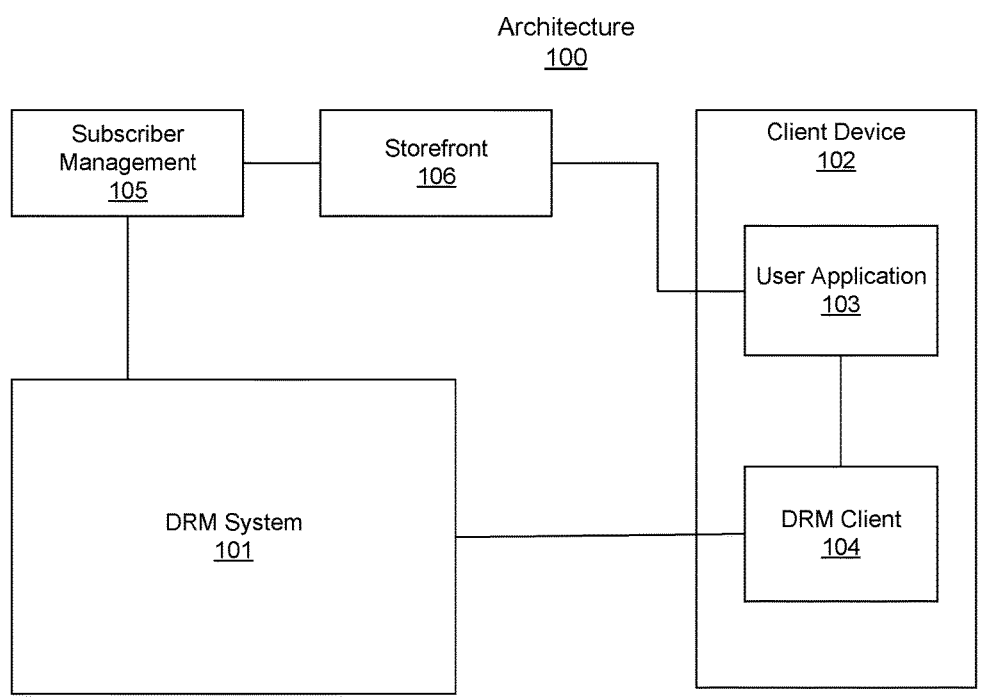
FIG. 1 is a block diagram illustrating an architecture including a DRM system in communication with a client device, according to an example of the present disclosure.

According to a first embodiment, there is a client device associated with digital rights management (DRM), operable in an offline mode with respect to a communications network, the device including a processor configured determine whether client device is in an on-line mode, if client device is in an online-mode, to identify a stored rights object associated with a stored asset, wherein the rights object includes reporting duration information associated with the stored asset. The processor is also configured to determine whether a transmission of an early status message is a successful communication based on an early status message determination. If a failure in communicating the early status message is determined, the processor is also configured to utilize the stored asset.

According to a second embodiment, there is a method of performing digital rights management (DRM), operable in an offline mode with respect to a communications network. The method includes determining whether client device is in an on-line mode, if client device is in an online-mode, identifying a stored rights object associated with a stored asset. The stored rights object includes reporting duration information associated with the stored asset. The method also includes determining, utilizing a processor, whether a transmission of an early status message is a successful communication based on an early status message determination. If a failure in communicating the early status message is determined, the method also includes utilizing the stored asset.

According to a third embodiment, there is a non-transitory computer readable medium (CRM) storing computer readable instructions which, when executed by a computer system, perform a method of performing digital rights management (DRM), operable in an offline mode with respect to a communications network. The method includes determining whether client device is in an on-line mode, if client device is in an online-mode, identifying a stored rights object associated with a stored asset. The stored rights object includes reporting duration information associated with the stored asset. The method also includes determining, utilizing a processor, whether a transmission of an early status message is a successful communication based on an early status message determination. If a failure in communicating the early status message is determined, the method also includes utilizing the stored asset.

According to a fourth embodiment, there is a communicating system, configured to operate with a digital rights management (DRM) system and operable in an offline mode with respect to a communications network. The system includes an input configured to receive a reporting protocol message including a reporting protocol data object including reporting duration information associated with an asset associated with the DRM system and a client device identification. The system also includes a processor configured to determine whether a DRM system comparison value is associated with the asset and the client device identification associated with a corresponding received comparison value associated with the received reporting duration information. If a DRM system comparison value is associated with the asset and the client device identification, the processor is configured to compare the DRM system comparison value and the corresponding received comparison value. If the received comparison value is not equivalent to the DRM system comparison value, the processor is configured to modify the DRM system comparison value based on at least one of the received comparison value and the received reporting duration information.

According to a fifth embodiment, there is a method of performing digital rights management (DRM), associated with a DRM system and operable in an offline mode with respect to a communications network. The method includes receiving a reporting protocol message including a reporting protocol data object including reporting duration information associated with an asset associated with the DRM system and a client device identification. The method also includes determining, utilizing a processor, whether a DRM system comparison value is associated with the asset and the client device identification associated with a corresponding received comparison value associated with the received reporting duration information. If a DRM system comparison value is associated with the asset and the client device identification, the method includes comparing the DRM system comparison value and the corresponding received comparison value, If the received comparison value is not equivalent to the DRM system comparison value, the method includes modifying the DRM system comparison value based on at least one of the received comparison value and the received reporting duration information.

According to a sixth embodiment, there is a non-transitory computer readable medium (CRM) storing computer readable instructions that when executed by a computer system perform a method of performing digital rights management (DRM) associated with a DRM system and operable in an offline mode with respect to a communications network. The method includes receiving a reporting protocol message including a reporting protocol data object including reporting duration information associated with an asset associated with the DRM system and a client device identification. The method also includes determining, utilizing a processor, whether a DRM system comparison value is associated with the asset and the client device identification associated with a corresponding received comparison value associated with the received reporting duration information. If a DRM system comparison value is associated with the asset and the client device identification, the method includes comparing the DRM system comparison value and the corresponding received comparison value, If the received comparison value is not equivalent to the DRM system comparison value, the method includes modifying the DRM system comparison value based on at least one of the received comparison value and the received reporting duration information.

According to a seventh embodiment, there is a non-transitory computer readable medium (CRM) storing computer readable instructions that when executed by a computer system perform a method of accessing a protocol including a data object utilized in performing digital rights management (DRM). The method includes accessing the data object, and extracting, utilizing a processor of the computer system, duration information from one or more fields in the data object.

According to the embodiments, client devices in an offline mode having a stored digital asset are permitted to access or utilize a stored asset without any inconvenience or delay/denial of access to a user. At the same time, any loss of control which may be associated with permitting the client devices to utilize their stored assets while offline, is reduced or eliminated. The rights, including rental rights, subscription rights, and/or purchase rights associated with the stored assets at the client devices are maintained and managed precisely and accurately by the DRM system managing the rights, and the time frames which are associated with the rights, associated with the stored assets. The rights and their associated time frames are maintained and managed, precisely and accurately, regardless as to whether a client device utilizing a stored asset offline is a user's sole client device, or part of a user's group of multiple devices in which a plurality include a stored copy of the asset.

DETAILED DESCRIPTION

For simplicity and illustrative purposes, the present disclosure is described by referring mainly to examples thereof. In the following description, numerous specific details are set forth in order to provide a thorough understanding of the examples in the present disclosure. It is readily apparent however, that the present disclosure may be practiced without limitation to these specific details. In other instances, some methods and objects have not been described in detail so as not to unnecessarily obscure the present disclosure. Furthermore, different examples are described below. The examples may be used or performed together in different combinations. As used herein, the term "includes" means includes but is not limited to the term "including". The term "based on" means based at least in part on.

Referring to FIG. 1, there is shown an architecture 100 including a DRM system 101 and a client device 102. The architecture 100 includes a communications network that may provide only intermittent or irregular access to the client device 102 and/or the DRM system 101. The client device 102 may include various applications such as a user application 103 and a DRM client application 104. The DRM client 104 interacts with the DRM system 101 in managing the digital rights of assets utilized through the client device 102. According to the example, the architecture may include one or more external components to the DRM system 101, including a subscriber management system 105 which may include an operations support system/billing support system, which may provide authorization information to the DRM system 101 and to other components within the architecture 100, such as storefront 106 in communication with the DRM system 101 and/or the client device 102. An interface between the subscriber management system 105 and the DRM system 101 may be based on a client-server model of interaction, with the subscriber management system 105 acting as the server. According to an example, the subscriber management system 105 may implement two processes, one for authorizing DRM clients, such as DRM client 104, to register with the DRM system 101, and another for communicating rights information associated with assets acquired by a subscriber. In these processes of the example, requests/responses may be exchanged over the interface using the HTTP GET method. Responses may be encoded as URLs or encoded as simple XML objects of media type text/xml.

The architecture 100 may support the DRM system 101 in providing authorization information to client devices, such as client device 102, having intermittent or irregular access to a communications network. According to an example, the DRM system 101 refers to the infrastructural part of the DRM system which is separate from the DRM client 104. The DRM system 101 may be located, completely or in part, at a content distribution center such as a headend. According to the example, the DRM system 101 may not include a DRM client, such as the DRM client 102, at a client device, such as client device 102. The types of client devices which may have intermittent access to the communications network include mobile phones, tablets, portable media players, mobile two-way devices and other devices which may not be mobile, but which have irregular access to a communications network, such as personal computers and other computers, such. In an online mode, the access to the communications network may be utilized to obtain rights authorization(s) to access or utilize content which has been downloaded, or otherwise transferred to, and stored at the client device.

Architectures, such as the architecture 100, may support different access modes, such as a purchase, a rental, and/or a subscription access to assets may include protected content. Architecture 100 may also support offline playbacks of downloaded assets with the appropriate rights, depending upon the access mode(s) and/or the acquired right(s) associated with the asset(s). Architecture 100 may also allow multiple devices, which are associated with one user account, or a plurality of user accounts, to access a same set of assets through a same set of acquired rights. The assets are not limited and may include media objects, such as movies, pictures, text, audio and/or video clips and other items such as data files and/or metadata which may be involved in accessing or utilizing an asset.

An asset may be associated with one or more windows and associated window durations, such as a play window or a rental access window. For example, an asset such as a movie may have a rental access window of a set period of time, or a duration such as 72 hours duration associated with a rental of the movie. The rental may permit limited or unlimited plays of the movie within the rental access window. The movie itself may have a play window lasting one or more hours in duration. A remaining play window duration, according to an example, may be the remainder period of time in the play window after the play window has first started, regardless as to pauses in playing the movie. In another example, a remaining play window duration may account for pauses in actively utilizing an asset. Other criteria may be used to determine a remaining duration for either a play window or a rental access window. A remaining rental access window is commonly the remainder period of time in the rental access window after the rental access window is first initiated although other criteria may be used.

The first playback of an asset on a client device may start a play window of the asset and/or the rental/subscription/purchase access window of a rental/subscription/purchase of the asset. Access models associated with rentals, subscriptions and purchases are described in greater detail below. A first playback of an asset on one client device may also occur after a play window for the same asset has already started on another client device which is associated with a single user account, or a plurality of user accounts. The first playback of the rental asset among all client devices associated with a single or multiple user account(s) may determine a start of the play window of the rental. A second or subsequent first playback of an asset may also determine a start of a play window and/or rental access window.

Rights renewal of an asset may occur through periodic extensions of expiration times for assets covered by a subscription right. Rights revalidation may occur through a periodic connection to a server of the DRM system 101 to confirm validation of current rights such that a user's client device holding a which right has not been revoked and therefore the client device should have continued access to the assets. If revalidation does not happen before a configured deadline, access to an asset may be suspended.

A play window may be a period which begins at the first playback of a rental asset. A subscriber may be allowed to play the rental asset during the play window. A user application 103 may be an application executing on a user's client device 102 which may provide a user interface for the user to access a catalog of available assets, make purchases, and access authorized assets downloaded on the client device 102. The client device 102 is a device, such as mobile device, which is used by the subscriber to download and/or access and utilize an asset including content protected through the DRM system 101.

An access model for accessing protected content may be associated with a purchase, a rental or a subscription associated with an asset. In a purchase, a right is provided to the subscriber for continuous use of an asset. Access to the asset may be subject to an optional periodic rights revalidation. The revalidation interval may be configurable. In a rental, an asset is provided to the subscriber for use before an expiration date. Use of the rental asset may be limited to a play window, which starts on the first playback of the asset. The rental access window and play window durations may be configurable. In a subscription access model, there may be a collection of assets provided for subscriber use under similar terms. A subscription right may expire periodically thus needing to be renewed for continued access. The renewal interval may be configurable.

In initially obtaining an asset and rights acquisition associated with the asset, a subscriber may utilize the user application 103 to access a content catalog and/or asset management system associated with the DRM system 101. These may be located within the infrastructure of the DRM system 101, according to an example. A content catalog and/or asset management system may be located within a separate facility external to the DRM system 100, such as storefront 106 described in greater detail below. The subscriber may browse a catalog of available assets. Then the subscriber may select and order an asset. The subscriber management system 105 may process the order and update its database. The user application 103 may then retrieve a protected asset from online repository associated with the DRM system 101 and the asset is downloaded or otherwise transferred to a storage in or associated with a client device, such as the client device 102. The user application 104 may then call the DRM client 104. The DRM client 104 may then query the DRM system 101. The DRM system 101 may then query subscriber management system 105 for rights information associated with the asset. The DRM system 101 may then return rights information associated with the asset. The DRM client 104 may then execute a key acquisition sequence to acquire a decryption key for the asset. The DRM client 104 may then create a rights object which is stored at the client device 102 and is associated with the stored asset at the client device 102.

In a normal playback at the client device 102 of the stored asset for which rights have been acquired previously (i.e., during a continuous and uninterrupted access by the client device 102 to the communications network), a local rights object may already exist for the asset which was requested by the subscriber from the storefront 106. The local rights object allows playback of the requested asset. The subscriber instructs the user application 103 in the client device 102 to playback the downloaded asset. The user application 103 may then make a rights call to the DRM client 104 in the client device 102. The DRM client 104 may then find a locally stored (i.e., stored at the client device 102) rental rights object for the asset, which authorizes a playback of the stored asset. The user application 103 may then make a play call to the DRM client 104. The DRM client 104 may then decrypt and stream the asset to a media player module in client device 102. The media player module may decode and display the decrypted asset.

In a first playback of rental content during a period of continuous and uninterrupted access by the client device 102 to the communications network, a subscriber instructs the user application 103 to play back downloaded asset. The user application 103 may then make a call to the DRM client 104. The DRM client 104 may then locate a locally stored unexpired rental rights object for the asset, which may have a play window duration but may have no play window expiration time. The DRM client 104 may then establish a connection to the DRM system 101. The DRM client 104 may then report a playback of the asset to the DRM system 101. The DRM system 101 may then report a playback start time of asset to the subscriber management system 105. The subscriber management system 105 may then transmit back the updated rights information about the asset to DRM system 101. The DRM system 101 may then transmit back updated rights information which may now include a play window expiration time value, to the DRM client 104 which creates an updated rights object. The user application 103 may then make a play call to the DRM client 104 which then decrypts and streams asset to a media player module in the client device 102. The media player module may then decode and display the decrypted asset.

A rights revalidation or renewal may occur when the client device 102 is online and the DRM client 104 is already registered with the DRM system 101. The rights revalidation or renewal may be triggered by a scheduler based on revalidation deadlines which may be configured. In the rights revalidation or renewal, the DRM client 104 establishes a connection to the DRM system 101. The DRM client 104 may then transmit identifier(s) for purchase/subscription assets to the DRM system 101. The DRM system 101 then checks the DRM client status of the DRM client 104 and may then transmit back confirmation of revalidation/renewal, together with updated revalidation deadlines or expiration times. Then the DRM client 104 may create and store updated rights objects revalidated or renewed rights of the associated assets.

Now there is an example of a playback, which occurs during a period of intermittent, discontinuous and/or interrupted access by the client device 102 to the communications network, is described. A subscriber first instructs the user application 103 to play back a downloaded asset. The user application 103 may then make a rights call to the DRM client 104. The DRM client 104 may then locate a locally stored unexpired rental rights object for the asset. The asset may have a play window duration time value and no play window expiration time value. The DRM client 104 may then attempt to establish a connection to the DRM system 101. The DRM client may then detect a failure to contact the DRM system 101. This detection may occur through various mechanisms, including receiving a notice of failure to communicate, a timed-based determination that no communication is established or other techniques known to those of ordinary skill in the art. The DRM client 104 may then record start and expiration times of a play window. The user application 103 may then make a play call to the DRM client 104. The DRM client 104 may then decrypt and stream an asset to a media player module in the client device 102. The media player module then decodes and displays decrypted asset. At some time later, after the client device is online again, the DRM client 104 may report a playback start time of the asset to the DRM System 101. The DRM system 101 may then report the playback start time of the asset to subscriber management system 105. The subscriber management system 105 may then transmit back updated rights information about the asset to DRM system 101. The DRM system 101 may then transmit back updated rights information, which may now include a play window expiration time, to the DRM client 104. The DRM client 104 may then create an updated rights object.

Figure 2:
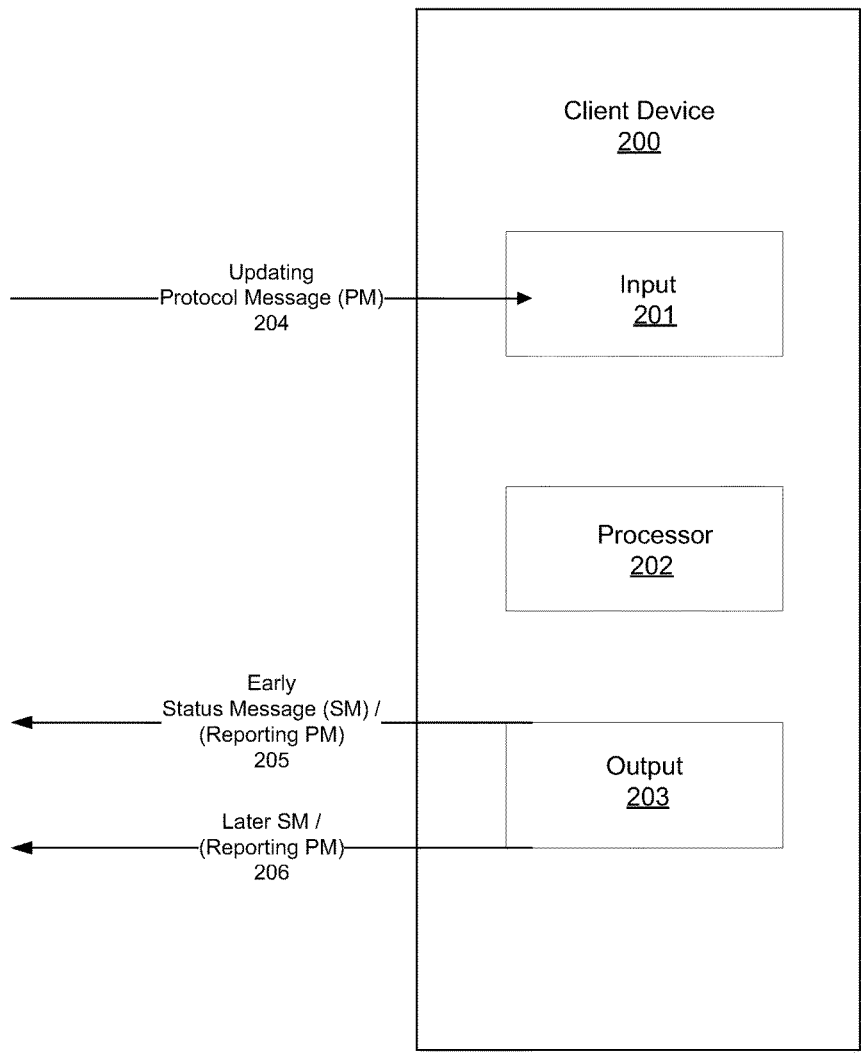
FIG. 2 is a block diagram illustrating a client device associated with the architecture shown in FIG. 1, according to an example of the present disclosure.

FIG. 2 demonstrates a client device 200, according to an example. Client device 200 may be a mobile phone, a pad computer, a tablet computer, portable media player, a portable computer, such as may be carried or installed in a car, or another mobile two-way device. The client device 200 may include an input 201, which may include an input terminal and/or an input module, to receive an updated protocol message 204, content, or other incoming information. The client device 200 may also include a processor 202 and an output 203. According to an example, the client device 200 may transmit an early status message 205 and a later status message 206 utilizing the output 203. In other examples, the early status message 205 or the later status message 206 may include a reporting protocol message (RPM). Other aspects of the client device 200 are discussed below with respect to FIG. 7.

Figure 3:
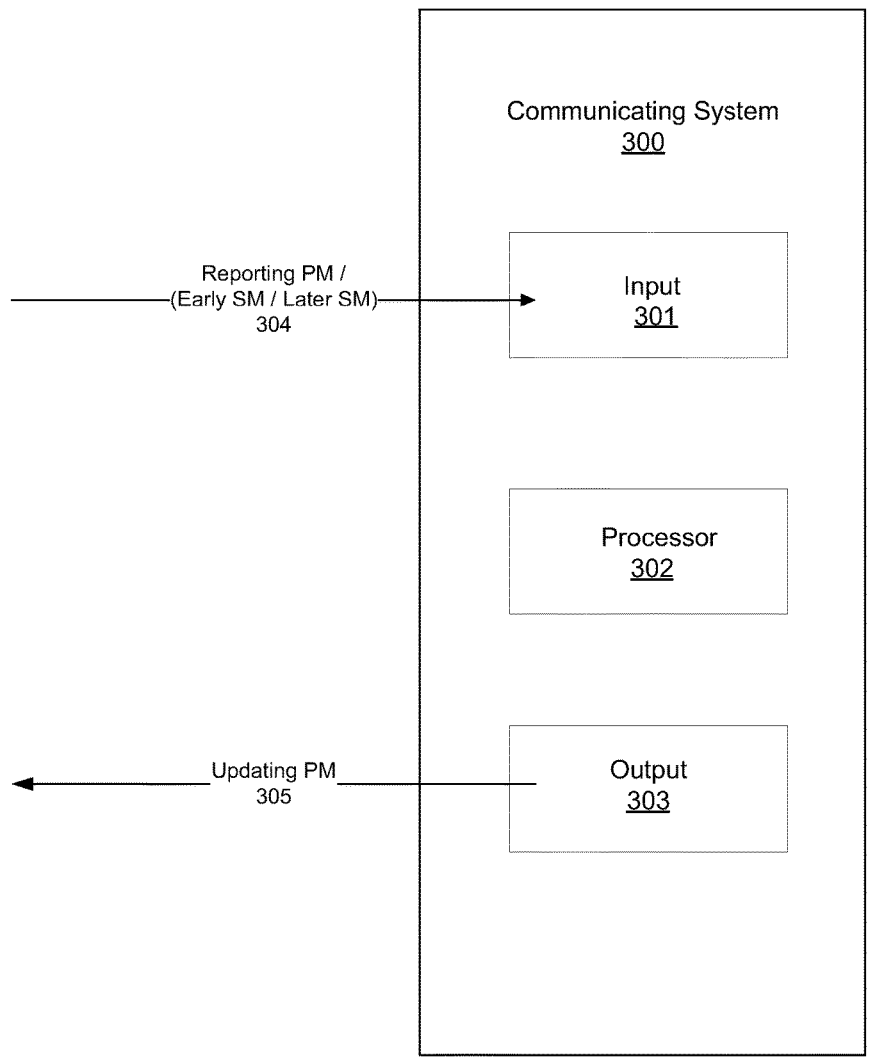
FIG. 3 is a block diagram illustrating a receiver system associated with the architecture shown in FIG. 1, according to an example of the present disclosure.

FIG. 3 demonstrates a communicating system 300, according to an example. The communicating system 300 is associated with a DRM system, such as DRM system 101. The communicating system may be physically incorporated, fully or partially, within the infrastructure of the DRM system 101, or it may be incorporated fully or partially within the infrastructure of one or more components the DRM system 101, which are external to the DRM system infrastructure, such as the subscriber management system 105 which is external to DRM system 101 in FIG. 1. The communicating system 300 may include an input 301 to receive a reporting protocol message (RPM) 304, or other incoming information. The communicating system 300 may also include a processor 302 and an output 303. According to an example, the communicating system 300 may receive RPM 304 as a separate message or packaged with another message, such as an early status message (ESM) or a later status message (LSM). The communicating system 300 transmits a protocol message 305 and/or other information utilizing the output 303. Other aspects of the communicating system 300 are discussed below with respect to FIG. 7.

A protocol, such as an updating protocol or a reporting protocol, is a set of rules which may govern a format of a message based on behaviors of participants associated with the message. The protocol may include a data object having a structure including various fields which are formatted to hold various data types. FIG. 6 demonstrates a report protocol 600, according to an example. Reporting protocol 600 is a data object which may include data types associated with a total rental period value, a rental period start/end time value, a remaining rental period duration value, a total play window duration value, a play window start/end time value, a play window expiration condition value, a remaining play window duration time value and a current time value. As shown in FIG. 6, fields corresponding with these data types include a total rental period value field 601, a rental period start/end time value field 602, a remaining rental period duration value field 603, a total play window duration value field 604, a play window start/end time value field 605, a play window expiration condition value field 606, a remaining play window duration time value field 607 and a current time value field 608.

According to different examples, a client device, such as the client device 200 in FIG. 2 and a communicating system, such as the communicating system 300 in FIG. 3 may be associated with a DRM system, such as the DRM system 101 in FIG. 1. These may be utilized separately or together in methods of performing DRM in either an online mode or an offline mode. Various manners in which the client device 200 and the communicating system 300 may be implemented are described in greater detail below with respect to FIGS. 4 and 5, which depict flow diagrams of methods 400 and 500.

Method 400 is a method of performing DRM with respect to a client device, operable in an offline mode with respect to a communications network. Method 500 is a method of performing DRM with respect to a communicating system, operable in an offline mode with respect to a communications network. It is apparent to those of ordinary skill in the art that the methods 400 and 500 represent generalized illustrations and that other blocks may be added or existing blocks may be removed, modified or rearranged without departing from the scopes of the methods 400 and 500. The descriptions of the methods 400 and 500 are made with particular reference to the DRM system 101 depicted in FIG. 1, the client device 200 depicted in FIG. 2 and the communicating system 300 depicted in FIG. 3. It should, however, be understood that the methods 400 and 500 may be implemented in DRM systems, communicating system and/or client devices which differ from DRM system 101, client device 200 and the communicating system 300 without departing from the scopes of the methods 400 and 500.

Figure 4:
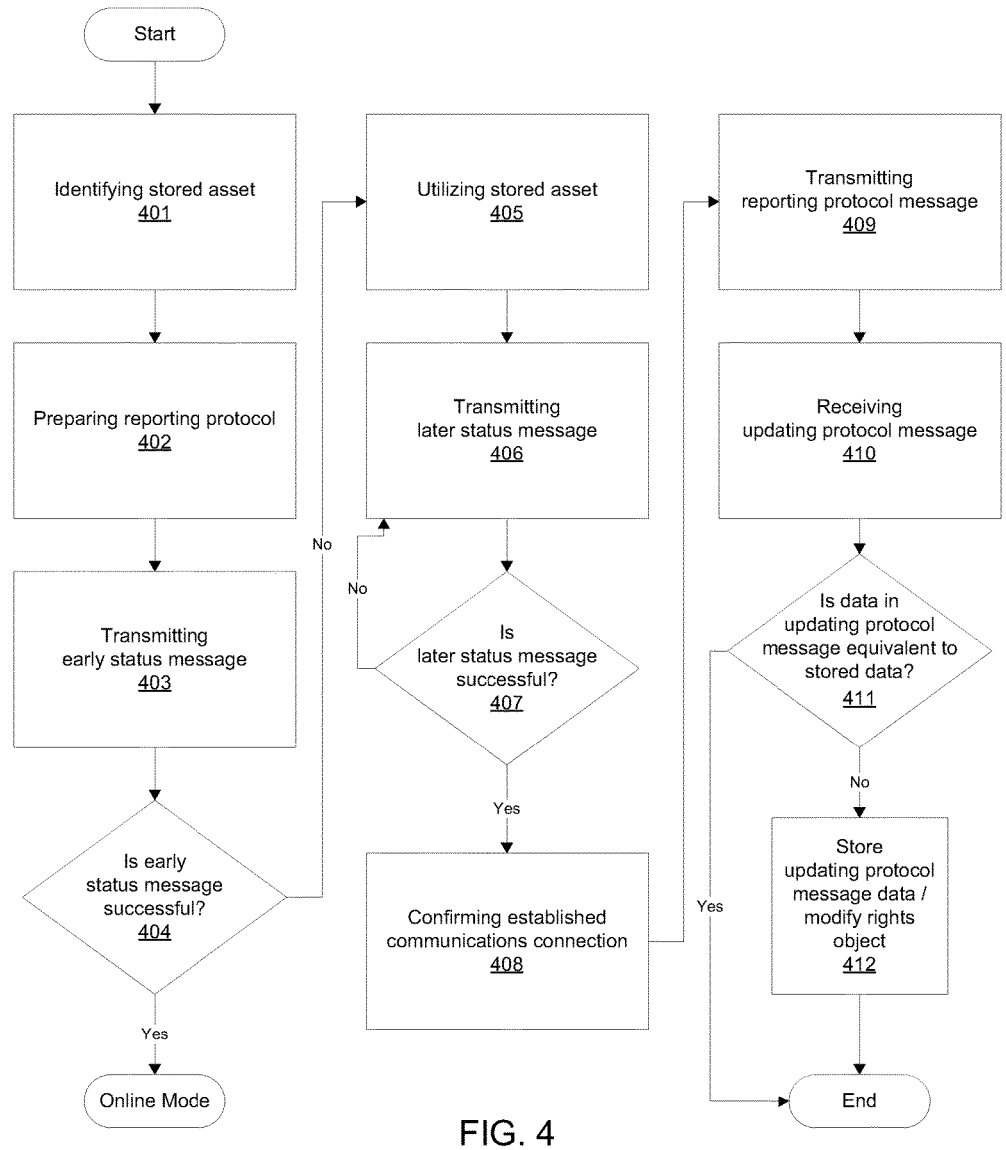
FIG. 4 is a flow diagram illustrating a method associated with the client device shown in FIG. 2, according to an example of the present disclosure.

With reference to the method 400 in FIG. 4, at block 401, the processor 202 in the client device 200 identifies a stored rights object associated with a stored asset stored in a storage of client device 200. The rights object includes reporting duration information associated with a stored asset, also in a storage of client device 200.

At block 402, the processor 202 in the client device 200 prepares a reporting protocol including the reporting duration information associated with the stored asset in the rights object. The duration information may include any time related information carried in the data object of the protocol. The time related information may be values associated with a point in time or a period of time. The duration information is associated with the various fields in the data object of the protocol. The reporting duration information may vary, and may include data describing a play window duration, a play window start time, a play window end time, an expiration period duration, an expiration period start time, an expiration period end time, an expiration period condition, an expiration period associated with a rental period of a rental right, etc. The expiration period may be associated with a rights renewal, a rights revalidation and a rights extension associated with the end of the expiration period. The data in the reporting protocol may include one or more fields for the data. FIG. 6A depicts a data object of a reporting protocol 600 as an example.

The data object of reporting protocol 600 includes fields formatted to hold data associated with a total expiration period value, an expiration period start/end time value, a remaining expiration period duration value, a total play window duration value, a play window start/end time value, a play window expiration condition value, a remaining play window duration time value and a local current time value. The corresponding fields for this data in reporting protocol 600 are total expiration period value field 601, expiration period start/end time value field 602, remaining expiration period duration value field 603, total play window duration value field 604, play window start/end time value field 605, play window expiration condition value field 606, a remaining play window duration time value field 607 and a local current time value field 608.

The reporting protocol may be DRM system requested reporting protocol, reporting protocol which the client device transmits when it come online after a period offline or which the client device 200 attempts to transmit at regular intervals regardless of online or offline status.

At block 403, the output 203 in client device 200 transmits an early status message. The early status message may be merely a test message to determine if the client device 200 and/or the communicating system 300 are online. The early status message may also include other information or messages. In one example, the early status message is a reporting protocol message which packages a reporting protocol.

At decision block 404, the processor 202 determines whether the transmission of the early status message is successful. The determination may be done through the various mechanisms known to those having ordinary skill in the art, such as reading a notification indicating a transmission success or failure. Another mechanism may include letting a predetermined interval elapse without receiving any response notification from the entity transmitted to, such as the DRM system 101. If the early status message is successful, this indicates that the client is in online mode and rights associated with the rights object and/or stored asset are updated and controlled in the online mode.

At block 405, after the processor 202 determines that the early status message is not successful and the client device 200 is in offline mode, the processor 202 may access and utilize the asset in the offline mode.

At block 406, the output 203 in the client device 200 transmits a later status message. The later status message, like the early status message may be merely a test message to determine if the client device 200 and/or the communicating system 300 are online. The later status message may also include other information or messages. In one example, the later status message is a reporting protocol message which packages a reporting protocol.

At decision block 407, the processor 202 determines whether the transmission of the later status message is successful. The determination regarding the later status message is similar to that which may be utilized in determining whether an early status message described at decision block 404, and are known to those having ordinary skill in the art. If the processor 202 determines that the later status message is not successful, this indicates that the client device remains in offline mode. Stored assets at the client device 200 may still be utilized by the processor 202 without having the rights object modified to reflect circumstances or conditions outside the client device 102, such as a revocation of a purchase right associated with a stored asset previously downloaded to the client device 200. The processer 202 may instead institute alternate routines, such as limiting usage of the stored asset. After the processor 202 determines that the later status message is not successful, the client device 200 must transmit a second or subsequent later status message before it may leave the offline mode.

At block 408, the processor 202 confirms the determination that there has been a successful transmission of the later status message and establishes a communications connection. At this block, the client device 200 leaves the offline mode and enters the online mode.

At block 409, the output 203 in the client device 200 transmits a reporting protocol message including the reporting protocol described as prepared at block 402. The reporting protocol may also be prepared at any subsequent block up to and including block 409.

At block 410, the input 201 in the client device 200 receives an updating protocol message including an updating protocol. The data in the updating protocol may include one or more fields for the data. FIG. 6B depicts a data object of a protocol 650 as an example. Like the data object of reporting protocol 600, the data object of updating protocol 650 includes fields formatted to hold data associated with a total expiration period value, an expiration period end time value, a remaining expiration period duration value, a total play window duration value, a play window start time value, a play window expiration time value, a remaining play window duration time value and a online current time value. The corresponding fields for this data in updating protocol 650 are total expiration period value field 651, expiration period end time value field 652, remaining expiration period duration value field 653, total play window duration value field 654, play window start time value field 655, play window expiration time value field 656, a remaining play window duration time value field 657 and an online current time value field 658. The online current time value filed 658 may be utilized to update a local current time value at the client device.

The updating protocol 650 may be client device requested updating protocol, an updating protocol which the DRM system transmits when it comes online after a period offline or which the DRM system 101 attempts to transmit at regular intervals regardless of online or offline status.

At decision block 411, the processor 202 determines whether data in the whether a received value associated with the received updating duration information in the reporting protocol is equivalent to a corresponding stored value associated with the stored local duration information.

At block 412, if the received value is not equivalent to the stored value, the processor 202 stores part or all of the received updating duration information in the updating protocol message in a storage at the client device 102. The processor 202 may also update the rights information associated with the rights object stored at the client device 102.

Figure 5:
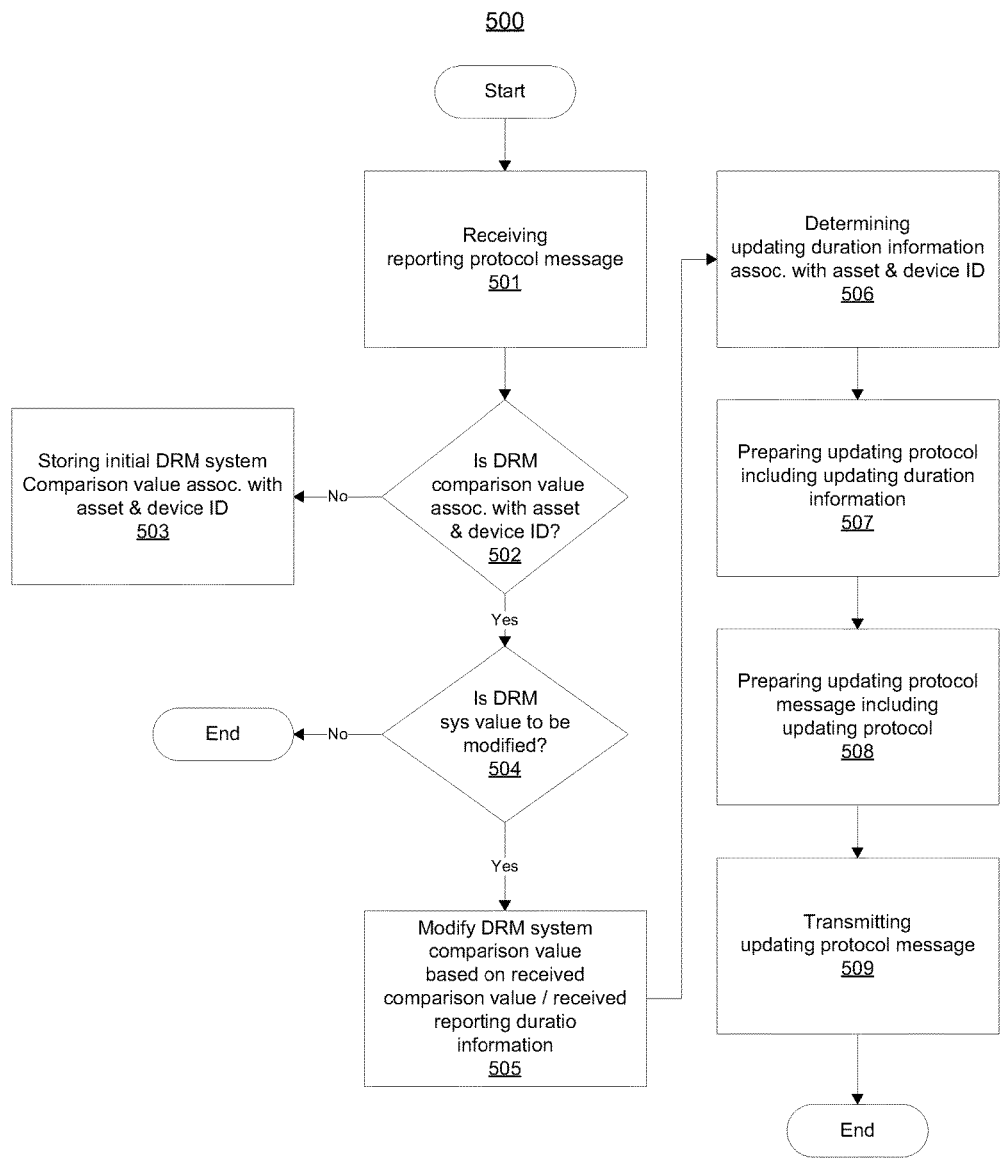
FIG. 5 is a flow diagram illustrating a method associated with the receiver system shown in FIG. 3, according to an example of the present disclosure.

With reference to the method 500 in FIG. 5, at block 501, the input 301 in the communicating system 300 receives a reporting protocol message including a reporting protocol. The reporting protocol includes reporting duration information associated with an asset associated with the DRM system 101 and a client device identification associated with the client device 102 at the DRM system 101.

At decision block 502, the processor 302 in the communicating system 300 determine whether a DRM system comparison value is associated with the asset and the client device identification which are associated with a corresponding received comparison value associated with the received reporting duration information.

The DRM comparison value is associated with the asset and the client device identification. In one example, the DRM comparison value may be a separate value extracted from a field in database at the DRM system. Or the DRM comparison value may be values taken from several fields in a DRM system database associated with the asset which is associated with the reporting protocol. In another example, the DRM comparison value may be a composite of data taken from the one or more fields in the DRM system database.

The corresponding received comparison value is associated with the received reporting duration information and is also associated with the asset and the client device identification. In one example, the corresponding received comparison value may be a separate value extracted from a field in the reporting protocol. Or the corresponding received comparison value may be values taken from several fields in the reporting protocol. In another example, the corresponding received comparison value may be a composite of data taken from the one or more fields in the reporting protocol.

Returning to decision block 502, if a DRM system comparison value is not associated with the asset, at block 503, the processor 302 stores an initial DRM system comparison value in the DRM system database. An initial DRM system comparison value is associated with an asset based on at least one of the received corresponding comparison value and the received reporting duration information associated with the asset in the reporting protocol.

At decision block 504, if a DRM system comparison value is not associated with the asset and the client device identification, the processor 302 compares the DRM system comparison value and the corresponding received comparison value. If the received comparison value is not equivalent to the DRM system comparison value, at block 505, the processor 302 may modify the DRM system comparison value based on at least one of the received comparison value and the received reporting duration information.

At block 506, the processor 302 determines updating duration information associated with the asset based on DRM system generated duration information in a DRM system database which is associated with the asset and the client device identification.

At block 507, the processor 302 prepares an updating protocol including the updating duration information. The updating duration information may be associated with an asset stored in the client device 102. In another example, the updating duration information may be associated with a copy of an asset associated with a second client device identification associated with a user account associated with the client device identification of the client device 102.

At block 508, the processor 302 prepares an updating protocol message including the updating protocol prepared in block 507.

At block 509, the output 303 transmits the prepared updating protocol message.

Some or all of the operations set forth in the figures may be contained as a utility, program, or subprogram, in any desired computer readable storage medium. In addition, the operations may be embodied by computer programs, which can exist in a variety of forms both active and inactive. For example, they may exist as a machine readable instruction set (MRIS) program comprised of program instructions in source code, object code, executable code or other formats. Any of the above may be embodied on a computer readable storage medium, which include storage devices.

An example of a computer readable storage media includes a conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 7:
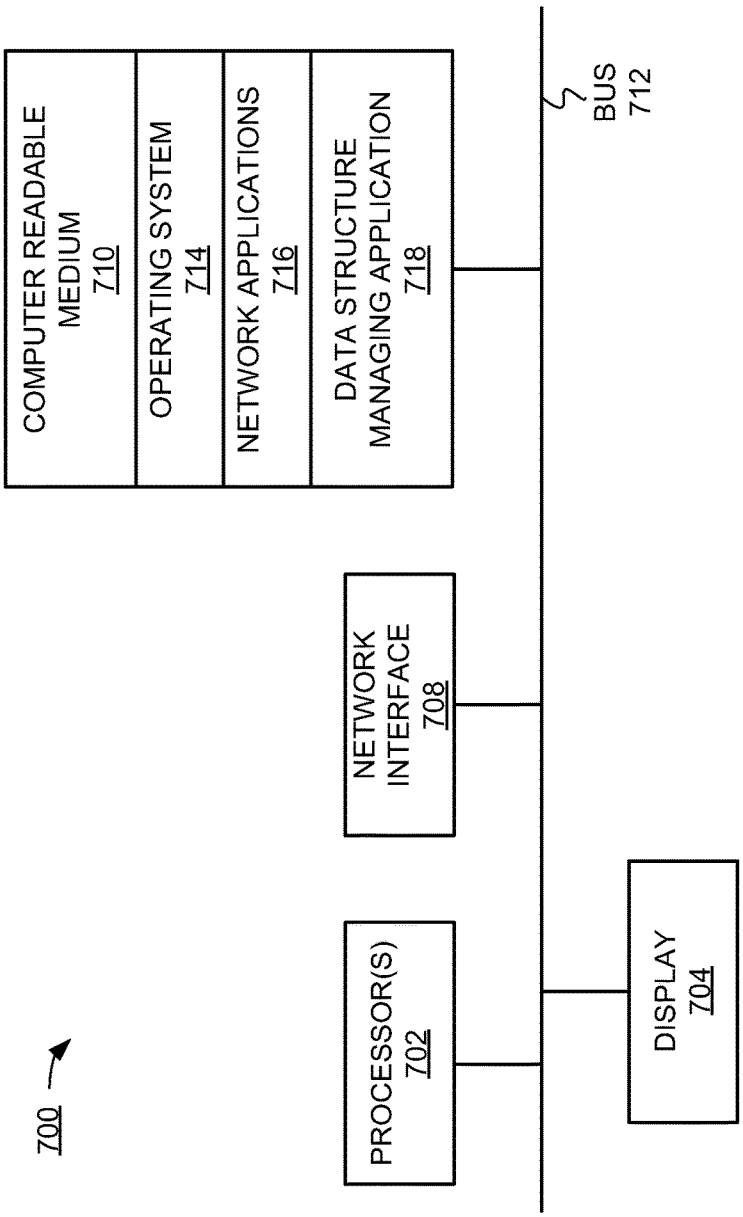
FIG. 7 is a block diagram illustrating a computer system which may be utilized as a platform to support the client device shown in FIG. 2 and/or the receiver apparatus shown in FIG. 3, according to the examples of the present disclosure.

Turning now to FIG. 7, there is shown a platform 700, which may be employed as a platform in a client device, such as client device 200 and/or a communicating system, such as communicating system 300, for implementing or executing the methods depicted in FIGS. 5 and 6, or code associated with the methods. It is understood that the illustration of the platform 700 is a generalized illustration and that the platform 700 may include additional components and that some of the components described may be removed and/or modified without departing from a scope of the platform 700.

The platform 700 includes a processor 702, such as a central processing unit; a display 704, such as a monitor; a network interface 708, such as a Local Area Network (LAN), a wireless 802.11x LAN, a 3G or 4G mobile WAN or a WiMax WAN; and a computer-readable medium 710. Each of these components may be operatively coupled to a bus 712. For example, the bus 712 may be an EISA, a PCI, a USB, a FireWire, a NuBus, or a PDS.

The computer readable medium 710 may be any suitable medium that participates in providing instructions to the processor 702 for execution. For example, the computer readable medium 710 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 710 may also store other MRIS applications.

The computer-readable medium 710 may also store an operating system 714, such as MAC OS, MS WINDOWS, UNIX, or LINUX; network applications 716; and a data object managing application 718. The operating system 714 may be multi-user, multiprocessing, multitasking, multi-threading, real-time and the like. The operating system 714 may also perform basic tasks such as recognizing input from input devices, such as a keyboard or a keypad; sending output to the display 704 and keeping track of files and directories on medium 710; controlling peripheral devices, such as disk drives, printers, image capture device; and managing traffic on the bus 712. The network applications 716 includes various components for establishing and maintaining network connections, such as MRIS for implementing communication protocols including TCP/IP, HTTP, Ethernet, USB, and FireWire.

The data object managing application 718 provides various MRIS components for building/updating a computer readable system architecture, for a non-volatile memory, as described above. In certain examples, some or all of the processes performed by the data object managing application 718 may be integrated into the operating system 714. In certain examples, the processes may be at least partially implemented in digital electronic circuitry, in computer hardware, firmware, MRIS, or in any combination thereof.

The examples illustrated above demonstrate client devices in an offline mode having a stored digital asset. The client devices are permitted to access or utilize a stored asset without any inconvenience or delay and/or denial of access of the asset to a user. At the same time, any loss of control which may be associated with permitting the client devices to utilize their stored assets while offline, is reduced or eliminated. The rights associated with the stored assets at the client devices are maintained and managed precisely and accurately by the DRM system managing the rights associated with the stored assets. The rights are maintained and managed, precisely and accurately, regardless as to whether a client device utilizing a stored asset offline is a user's sole client device, or part of a user's group of multiple devices in which a plurality include a stored copy of the asset.

Although described specifically throughout the entirety of the disclosure, representative examples have utility over a wide range of applications, and the above discussion is not intended and should not be construed to be limiting. The terms, descriptions and figures used herein are set forth by way of illustration only and are not meant as limitations.

Those skilled in the art recognize that many variations are possible within the spirit and scope of the examples. While the examples have been described with reference to examples, those skilled in the art are able to make various modifications to the described examples without departing from the scope of the examples as described in the following claims, and their equivalents.

What is claimed is:

1. A computer-implemented method of performing digital rights management (DRM), the method comprising:
responsive to a determination that a client device is offline:
utilizing a stored asset associated with a stored rights object, wherein the stored asset was previously downloaded to the client device and is not modified after the downloading and wherein the stored rights object is associated with at least a purchase right; and
recording, in reporting duration information associated with the stored asset, a time associated with the utilizing of the stored asset;
determining that the client device is online, responsive to a successful transmission of a second message from the client device to the DRM system; and
responsive to the determination that the client device is online:
reporting the utilization of the stored asset when the client device was offline and the recorded time in the reporting duration information associated with the utilization of the stored asset when the client device was offline to the DRM system;
receiving updated duration information from the DRM system based on the recorded time in the reporting duration information,
wherein the reporting duration information includes an expiration period that is associated with at least a purchase period of the purchase right, and the expiration period is associated with at least a rights revalidation that includes a validation of rights currently associated with the client device, and
wherein the updated duration information includes a checking online time value, a remaining play window duration value, a remaining expiration period duration value, a play window duration value, and an expiration duration value; and
modifying rights information associated with the stored rights object based on the received updated duration information.

2. The method of claim 1, wherein the reporting duration information further includes at least one of a play window duration, a remaining play window duration, or a remaining expiration period duration.

3. The method of claim 1, further comprising:
establishing a communications connection between the client device and the DRM system based on a determination of the successful transmission of the second message.

4. The method of claim 1, further comprising:
transmitting a reporting protocol to the DRM system, the reporting protocol comprising duration information of one or more rights associated with the stored rights object.

5. The method of claim 1, further comprising:
receiving an updating protocol message from the DRM system, the updating protocol message comprising a comparison value;
comparing the received comparison value with a stored comparison value;
determining whether to update the duration information associated with the stored asset based on the comparison; and
storing the received updated duration information based on the received comparison value being determined to not be equivalent to the stored comparison value.

6. The method of claim 1, wherein each of the at least one of a rental right, a subscription right or a purchase right, associated with the stored rights object has a predefined duration.

7. The method of claim 1, further comprising:
receiving a plurality of updating protocol messages at predefined recurring intervals.

8. A non-transitory computer-readable storage medium storing computer-executable instructions that, in response to execution, cause a computer processor to perform operations, comprising:
responsive to a determination that a client device is offline:
utilizing a stored asset associated with a stored rights object, wherein the stored asset was previously downloaded to the client device and is not modified after the downloading and wherein the stored rights object is associated with at least a purchase right; and
recording, in reporting duration information associated with the stored asset, a time associated with the utilizing of the stored asset;
determining that the client device is online, responsive to a successful transmission of a second message from the client device to the DRM system; and
responsive to the determination that the client device is online:
reporting the utilization of the stored asset when the client device was offline and the recorded time in the reporting duration information associated with the utilization of the stored asset when the client device was offline to the DRM system;
receiving updated duration information from the DRM system based on the recorded time in the reporting duration information,
wherein the reporting duration information includes an expiration period that is associated with at least a purchase period of the purchase right, and the expiration period is associated with at least a rights revalidation that includes a validation of rights currently associated with the client device, and
wherein the updated duration information includes a checking online time value, a remaining play window duration value, a remaining expiration period duration value, a play window duration value, and an expiration duration value; and
modifying rights information associated with the stored rights object based on the received updated duration information.

9. The computer-readable storage medium of claim 8, wherein the reporting duration information includes at least one of a play window duration, a remaining play window duration, or a remaining expiration period duration.

10. The computer-readable storage medium of claim 8, further comprising:
establishing a communications connection between the client device and the DRM system based on a determination of the successful transmission of the second message.

11. The computer-readable storage medium of claim 8, further comprising:
    transmitting a reporting protocol to the DRM system, the reporting protocol comprising duration information of one or more rights associated with the stored rights object.

12. The computer-readable storage medium of claim 8, further comprising:
    receiving an updating protocol message from the DRM system, the updating protocol message comprising a comparison value;
    comparing the received comparison value with a stored comparison value;
    determining whether to update the duration information associated with the stored asset based on the comparison; and
    storing the received updated duration information based on the received comparison value being determined to not be equivalent to the stored comparison value.

13. The computer-readable storage medium of claim 8, wherein each of the at least one of a rental right, a subscription right or a purchase right associated with the stored rights object has a predefined duration.

14. The computer-readable storage medium of claim 8, further comprising:
    receiving a plurality of updating protocol messages at predefined recurring intervals.

15. A computer system, comprising:
    a computer memory storing executable computer program instructions; and
    a computer processor configured to execute the computer program instructions stored in the memory for:
    determining that a client device is offline, responsive to failure of an attempted transmission of a first message from the client device to a DRM system;
    responsive to the determination that the client device is offline:
        utilizing a stored asset associated with a stored rights object, wherein the stored asset was previously downloaded to the client device and is not modified after the downloading and wherein the stored rights object is associated with at least a purchase right; and
        recording, in reporting duration information associated with the stored asset, a time associated with the utilizing of the stored asset;
    determining that the client device is online, responsive to a successful transmission of a second message from the client device to the DRM system; and
    responsive to the determination that the client device is online:
        reporting the utilization of the stored asset when the client device was offline and the recorded time in the reporting duration information associated with the utilization of the stored asset when the client device was offline to the DRM system;
        receiving updated duration information from the DRM system based on the recorded time in the reporting duration information,
            wherein the reporting duration information includes an expiration period that is associated with at least a purchase period of the purchase right, and the expiration period is associated with at least a rights revalidation that includes a validation of rights currently associated with the client device, and
            wherein the updated duration information includes a checking online time value, a remaining play window duration value, a remaining expiration period duration value, a play window duration value, and an expiration duration value; and
        modifying rights information associated with the stored rights object based on the received updated duration information.

16. The system of claim 15, wherein the reporting duration information includes at least one of a play window duration, a remaining play window duration, action, or a remaining expiration period duration.

17. The system of claim 15, further comprising computer program instructions for:
    establishing a communications connection between the client device and the DRM system based on a determination of the successful transmission of the second message.

18. The system of claim 15, further comprising computer program instructions for:
    receiving an updating protocol message from the DRM system, the updating protocol message comprising a comparison value;
    comparing the received comparison value with a stored comparison value;
    determining whether to update the duration information associated with the stored asset based on the comparison; and
    storing the received updated duration information based on the received comparison value being determined to not be equivalent to the stored comparison value.

* * * * *